Feb. 12, 1935.  J. B. HOFF ET AL  1,991,214
AUTOMATIC SAFETY SHUT-OFF VALVE
Filed May 6, 1933
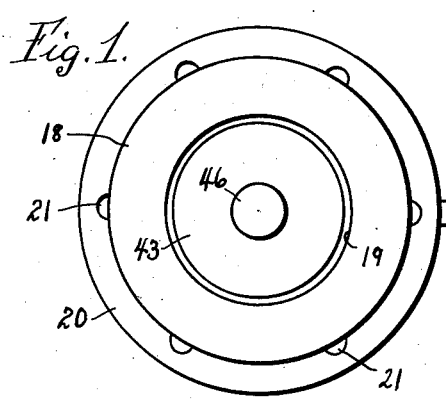
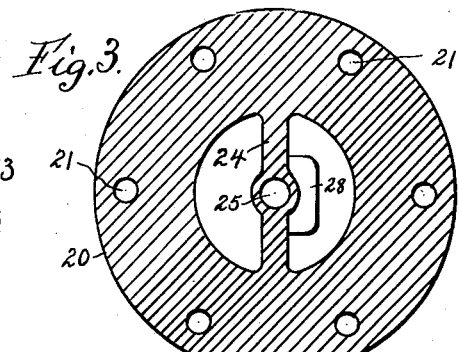
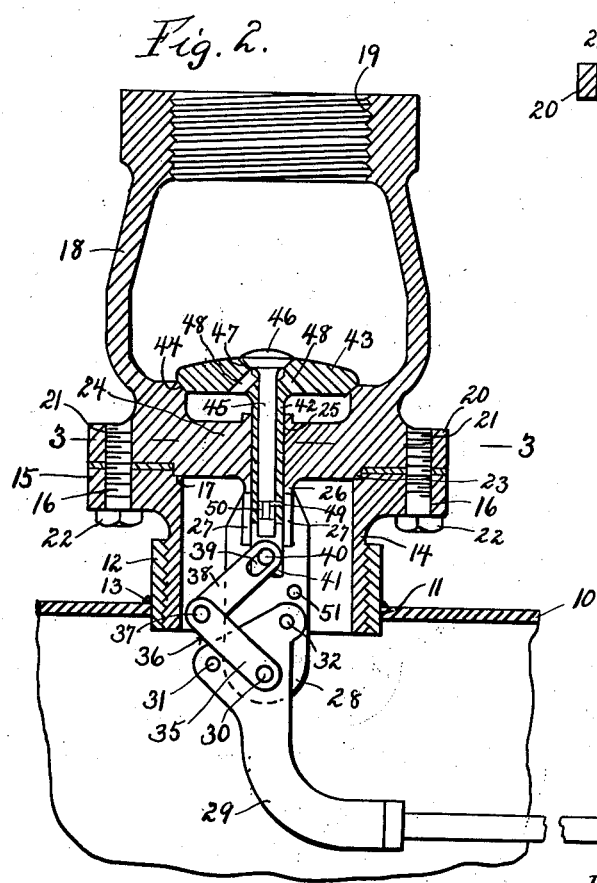
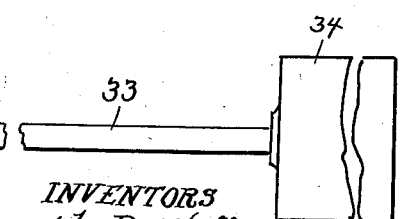
INVENTORS
Joseph B. Hoff
Walter C. Davidson
By W. W. Williamson
Atty.

Patented Feb. 12, 1935

1,991,214

UNITED STATES PATENT OFFICE 1,991,214

AUTOMATIC SAFETY SHUT-OFF VALVE

Joseph B. Hoff, Philadelphia, and Walter C. Davidson, Kirklyn, Pa.

Application May 6, 1933, Serial No. 669,648

5 Claims. (Cl. 137—104)

Our invention relates to new and useful improvements in an automatic safety shut-off valve, and more particularly to a float operated valve to prevent overflowing of fuel oil storage tanks, such as are used in connection with oil burners. One of the objects of the invention is to provide a differential valve structure for insertion in the tank filling line which will be quickly closed when the oil being supplied to the tank, reaches a predetermined level.

Fuel oil storage tanks are generally constructed of light gauge metal and are designed to maintain a very low pressure and therefore can be easily damaged or actually ruptured by excess pressure. It is essential to provide a vent for the tank to permit filling thereof and in most instances a vent pipe leads from the storage tank to the outside of the building. If oil is continued to be supplied to the tank after the latter has been filled to capacity, it may overflow and soil or damage property or provide a fire hazzard. The vent pipes sometimes run to great heights and even where the oil does not overflow, but merely partially fills the vent pipe, considerable pressure is added on the tank, often damaging and actually rupturing the same. Where the oil is pumped from a supply tank to the storage tank, pressure may be added to said storage tank, especially if the vent is trapped or choked.

Our invention overcomes these disadvantages and therefore it is an object of said invention to place means in the filling line to close the same when the storage tank is filled to prevent overflow at the vent, the addition of excess pressure on said tank or the placement of an undue head of oil on said tank or the parts of an oil burner which might cause damage or leakage.

Another object of the invention is to provide a unitary structure which may be readily inserted in a storage tank with the entire unit in assembled condition.

Another object of the invention is to provide a unique valve actuating mechanism wherein the relief valve may be readily opened prior to the opening of the main valve.

A further object of the invention is to provide, in combination, a tank flange for connection with the tank and a valve structure to be secured to the tank flange in a position that will cause the float and its stem to occupy a substantially longitudinal location relative to the tank.

With these and other ends in view, this invention consists in the details of construction and combination of elements hereinafter set forth and then specifically designated by the claims.

In order that those skilled in the art to which this invention appertains may understand how to make and use the same, we will describe its construction in detail, referring by numerals to the accompanying drawing forming a part of this application, in which:—

Fig. 1 is a top plan view of the safety shut-off valve unit with the stem of the float broken away.

Fig. 2 is a view partly in longitudinal section and partly in elevation, illustrating the valve connected to the tank.

Fig. 3 is a section of the valve casing on the line 3—3 of Fig. 2.

Fig. 4 is a fragmentary longitudinal sectional view of the valve on the center line of Fig. 2, with some of the parts left in elevation and the float and its valve stem removed.

In carrying out our invention as herein embodied, 10 represents a fuel oil storage tank in which an opening 11 is formed for the reception of an internally threaded collar 12 to be secured in place in any suitable manner, as by welding, which is indicated by 13.

In the collar is screwed the externally threaded shank 14 of the tank flange 15, the latter having a plurality of equally spaced holes therethrough for the reception of suitable fastening devices and also having a central recess 17 at the outer face bordering the bore through the flange and its shank.

A valve casing 18 has its outer end internally threaded as at 19 and is provided at its inner end with a flange 20, also having a plurality of holes 21 equally spaced and corresponding in number to the holes 16 in the flange 15, and when the valve casing is properly positioned on the storage tank flange, suitable fastening devices 22 are inserted in the holes 16 and 21 for securing the parts together. While any form of fastening devices may be utilized, they are here shown for purposes of illustration as stud bolts so that they have threaded connection with one of the elements, such as the flange 20 of the valve casing.

The inner end of the valve casing is provided with an annular projection 23 to fit in the recess 17 to assist in making a tight joint between the parts, and across the inner end of the valve casing is a bridge or spider 24 having a hole 25 therethrough to act as a bearing for the main valve stem to be presently described.

From the bridge or spider 24 depends a tubular bearing extension 26 slotted crosswise parallel with the bridge as indicated at 27. Also depending from the bridge and more particularly the tubular bearing extension 26 is a hanger 28 at the lower end of which is pivoted a float lever 29 as at 30, and said lever is provided with two toggle operating pins 31 and 32. A float stem 33 is suitably connected with the float lever 29 and on the outer end of said stem 33 is a float 34.

At the point 30 is also pivoted one end of a link 35 of the toggle 36, while the opposite end of said link 35 is pivoted at 37 to one end of the toggle link 38, and the opposite end of the latter link has a longitudinal slot 39 for connection with a pin 40 across the slot 41 in the lower end of the hollow stem 42 of the main valve 43, the latter being mounted for cooperation with the valve seat 44 in the casing 18.

The stem 42 of the main valve is slidably mounted in the bearing hole 25 and the extension bearing 26 and in said hollow stem is slidably mounted the stem 45 of the small secondary valve 46 cooperating with a seat 47 formed in the main valve controlling a number of passageways 48 leading through said main valve. The stem 45 of the secondary valve projects to a position in close proximity of the slotted end of the toggle link 38 for cooperation therewith, and the outward movement of said secondary valve may be limited by a pin 49 in the hollow stem of the main valve projecting into a reduced section of the stem 45.

The "breaking" movement of the toggle 36 is limited by the seating of the main valve and it is desirable after the final operating of the toggle has been made to cause the pivot point of the links to slightly pass to the opposite side of the vertical center of the combined links, whereby the toggle will be locked and the locking movement of the toggle is limited by a stop pin 51 carried by the hanger 28, preferably in the path of travel of the link 35.

It is to be particularly noted that the float 34 is to have but a relatively short movement and is installed in the storage tank very close to the top thereof. Attention is also called to the fact that the float is to be of a size that will permit its passage through the bore in the storage tank flange and the latter's shank and the curvature of the float lever 29 is such that it can also be passed through the tank flange and its shank for either assembling or disassembling the valve structure.

When a fuel oil storage tank is installed with our automatic safety shut-off valve, the pipe or conduit forming a part of the filling line is connected to the valve casing and said pipe or conduit is designed to withstand much higher pressures than the storage tank.

The operation of our invention is as follows:— Assuming that the storage tank 10 is filled with oil, the parts will be in the positions illustrated in Fig. 2 and very often, probably always, the filling line will also be filled with oil. As the oil is drawn off from the storage tank 10, the float 34 will gradually descend causing the pin 31 on the lever 29 to engage the link 35 of the toggle which will slide the slotted end of the link 38 along the pin 40, causing said slotted end of the link 28 to engage the lower end of the stem 45 to lift the secondary valve 46 from its seat without affecting the main valve 43. This can be accomplished because of the small surface of said secondary valve 46, regardless of any ordinary pressure of oil in the filling line. The unseating of the secondary valve permits the oil in the filling line to pass through the openings 48 in the main valve, thence through the lower opening end of the valve casing into the storage tank.

The continued downward movement of the float 34 after the oil has been drained from the filling line will finally cause the inner end of the slot 39 to engage the pin 40 and gradually lift the main valve 43 off its seat and cause the toggle to assume its locked position in an engagement with the stop pin 51.

The filling line to the tank is now completely open so that when a fresh supply is to be placed in the tank the oil will readily flow thereto through the filling line. As the oil nears the top of the tank, the float 34 will be gradually lifted until the pin 32 engages the toggle 36 moving it out of its locked position toward the "breaking" position, and as soon as the meeting ends of the links have passed beyond the longitudinal center of the two links, the pressure of oil on the valves will cause the main valve 43 to snap on to its seat, thereby reducing the amount of oil entering the tank. If the supply is now shut off, the secondary valve 46 will remain open due to contact of the toggle lever with the pin 31 and as the oil from the filling line enters the tank through the openings 48, the float will be lifted until said secondary valve finally closes. This will permit the filling line to be drained or partially drained of the oil therein so that the hose from the truck tank can be uncoupled without spilling any oil.

With the closing of the valves, the oil will not overflow through the vent in the tank, nor enter the vent pipe, if such is used, and likewise the pressure of the head of oil in the filling line or the pump which may be forcing oil into the storage tank is prevented from effecting said storage tank.

Of course we do not wish to be limited to the exact details of construction herein shown and described as these may be varied within the limits of the appended claims without departing from the spirit of our invention.

Having thus fully described our invention, what we claim as new and useful:—

1. In a device of the kind described, a casing open from end to end, a valve seat in said casing, a valve for co-operation with said seat, a stem carried by said valve, a pivoted float lever, a toggle lever having one end connected to the lower end of said valve stem and the other end attached to the pivoting means of said float lever, a pair of toggle operating means carried by the float lever in spaced relation, one of said means being located at each side of the toggle, one of said means co-operating with the toggle to move it from its broken position to its full open position and then to the opposite side of its longitudinal center, means to limit the movement of said toggle to said opposite side of its longitudinal center for locking said toggle, the other of said toggle operating means co-operating with the toggle to move it out of its locked position so as to place the valve in condition for quick closing, and a float connected with the float lever.

2. In a device of the kind described, a casing open from end to end, a bridge across the inner open end of the casing and provided with a bearing, a hanger depending from the bridge, a valve seat in the casing above the bridge, a valve for co-operation with said seat, a valve stem carried by said valve and slidably mounted in the bearing, a toggle lever having one end connected with the lower end of the valve stem, a float lever, means for pivoting the other end of the toggle lever and said float lever on the hanger, a pair of pins carried by the float lever, one of which co-operates with the toggle to move it from its broken position to its full open position and then to the opposite side of its longitudinal center, means carried by the hanger to limit the movement of the toggle to said opposite side of its longitudinal center for locking said toggle, the other pin on the float lever co-operating with the toggle to move it out of its locked position so as to place the valve in condition for quick closing, a float stem connected with the float lever, and a float at the outer end of said float stem.

3. In a device of the kind described, a casing open from end to end, a bridge across the inner open end of the casing and provided with a bearing, a hanger depending from the bridge, a valve seat in the casing above the bridge, a valve for co-operation with said seat, said valve having openings therethrough, a valve seat in said valve at the outer ends of said opening, a hollow valve stem carried by said valve and slidably mounted in the bearing, a secondary valve for coaction with the valve seat in the first mentioned valve, a valve stem carried by the secondary valve and slidably mounted in the hollow stem of said first mentioned valve, and means to gravitationally initially lock said valves open and subsequently operable by the buoyancy of a liquid to release the valves.

4. In a device of the kind described, a valve casing, a hanger depending from said casing a main valve having a hollow stem and provided with a valve seat from which lead openings through the head of said main valve, a secondary valve cooperating with the seat in the main valve and provided with a stem projecting through the hollow stem of said main valve, a toggle lever having one end slidably connected with the lower end of the first mentioned valve stem and coacting with the stem of the secondary valve and the other end of said toggle lever being pivoted to the hanger whereby the straightening of the toggle will first actuate the secondary valve for opening the same and then actuate the main valve to remove it from its seat, a float lever also pivoted to the hanger, a pair of pins carried by said float lever, one of which cooperates with the toggle to move it from its broken position to its full open position to the opposite side of its longitudinal center, means carried by the hanger to limit the movement of the toggle to said opposite side of its longitudinal center for locking said toggle, the other pin on the float lever cooperating with the toggle to move it out of its locked position so as to place the main valve in condition for quick closing and the subsequent closing of the secondary valve, a float stem connected with the float lever, and a float on the outer end of said float stem.

5. In a device of the kind described, a valve casing, a hanger carried thereby, a main valve having a hollow stem and provided with a valve seat from which lead openings through the head of said main valve, a secondary valve cooperating with the seat in the main valve and provided with a stem projecting through the hollow stem of said main valve, a toggle lever having one end slidably connected with the lower end of the main valve stem and coacting with the stem of the secondary valve and the other end of said toggle lever being pivoted to the hanger whereby the straightening of the toggle lever will first actuate the secondary valve for opening the same and then actuate the main valve to remove it from its seat, a lever also pivoted to said hanger, a pair of toggle engaging means on said lever, one of which cooperates with the toggle lever to move it from its broken position to its full open position to the opposite side of its longitudinal center, means carried by the hanger to limit the movement of the toggle lever to said opposite side of its longitudinal center for locking said toggle lever, the other means on the lever cooperating with the toggle lever to move it out of its locked position so as to place the main valve in condition for a quick closing and the subsequent closing of the secondary valve, and means to operate said lever.

JOSEPH B. HOFF.
WALTER C. DAVIDSON.